Jan. 30, 1962     C. F. BAMBER     3,018,630
AUTOMATIC VALVE

Filed Feb. 25, 1960     7 Sheets-Sheet 1

INVENTOR
Cletus F. Bamber
BY
 Basseches
his ATTORNEY

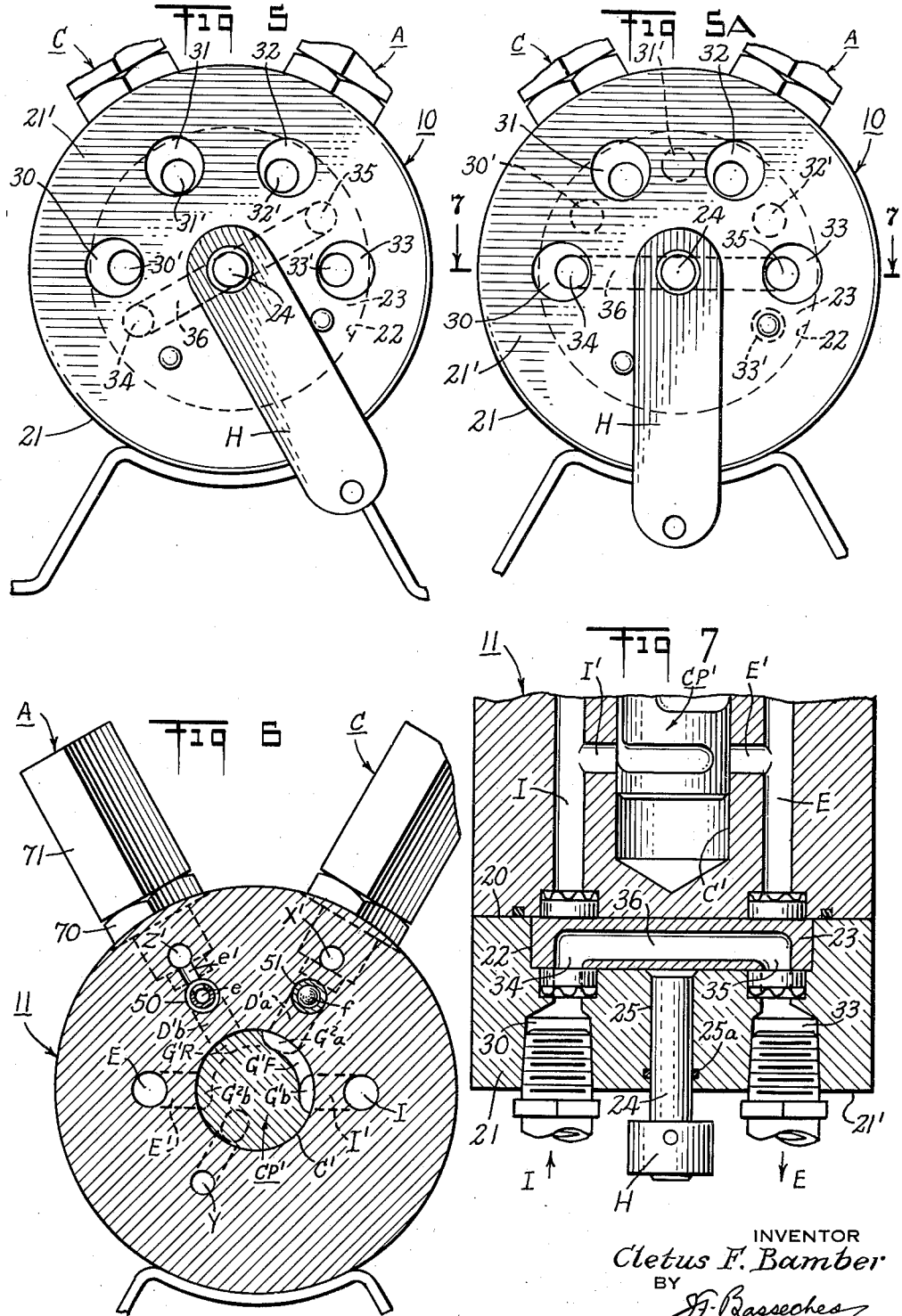

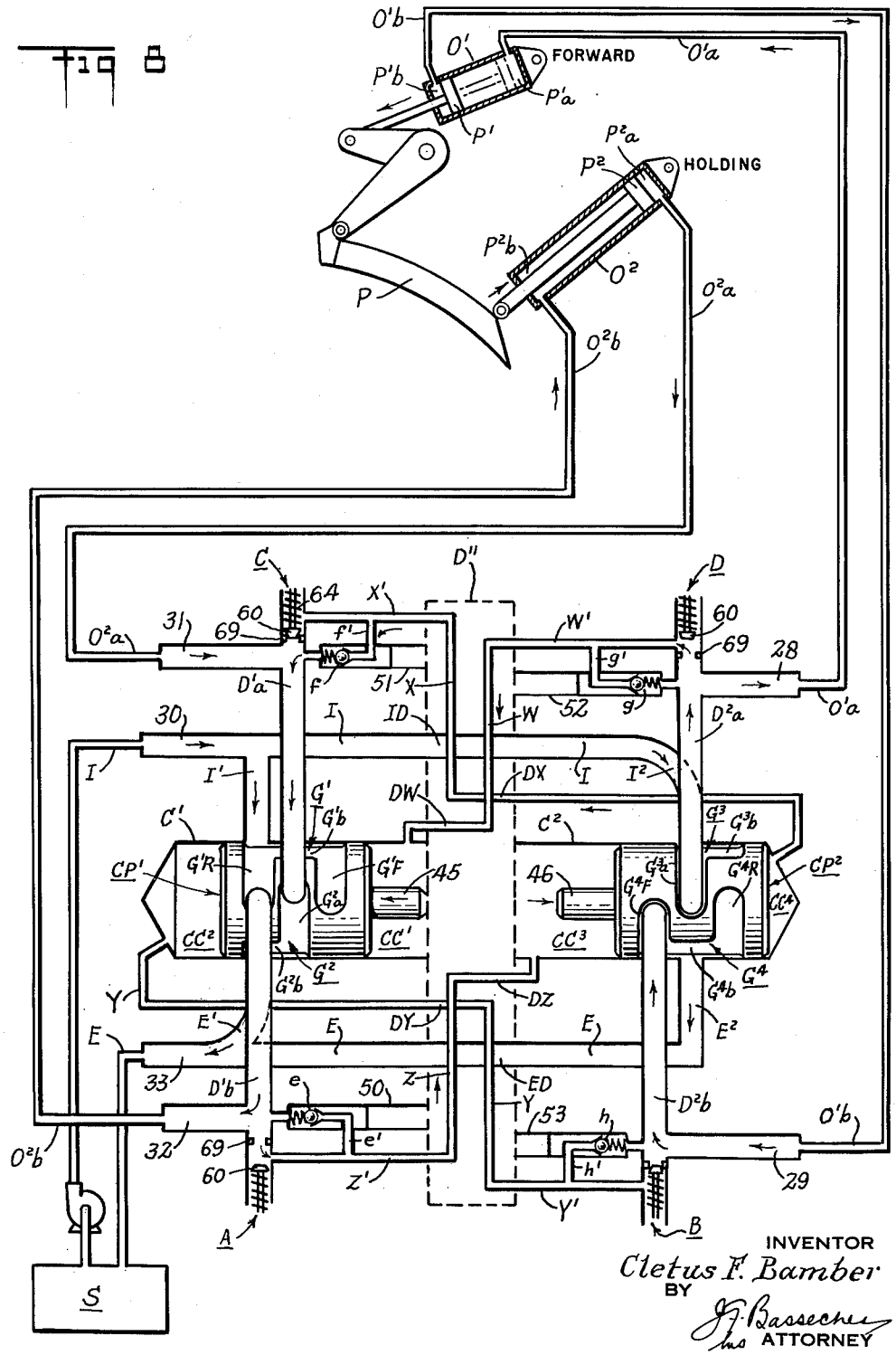

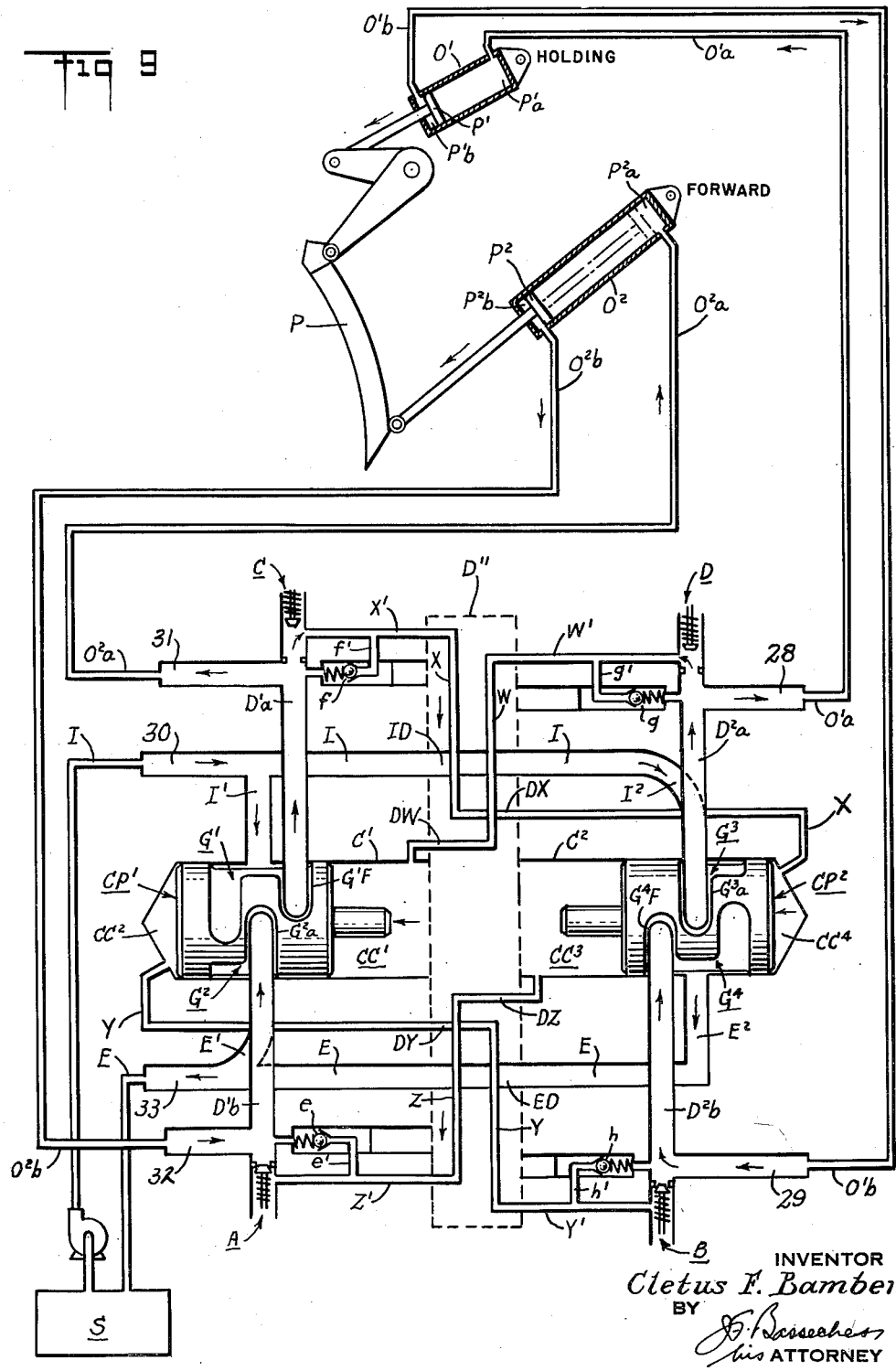

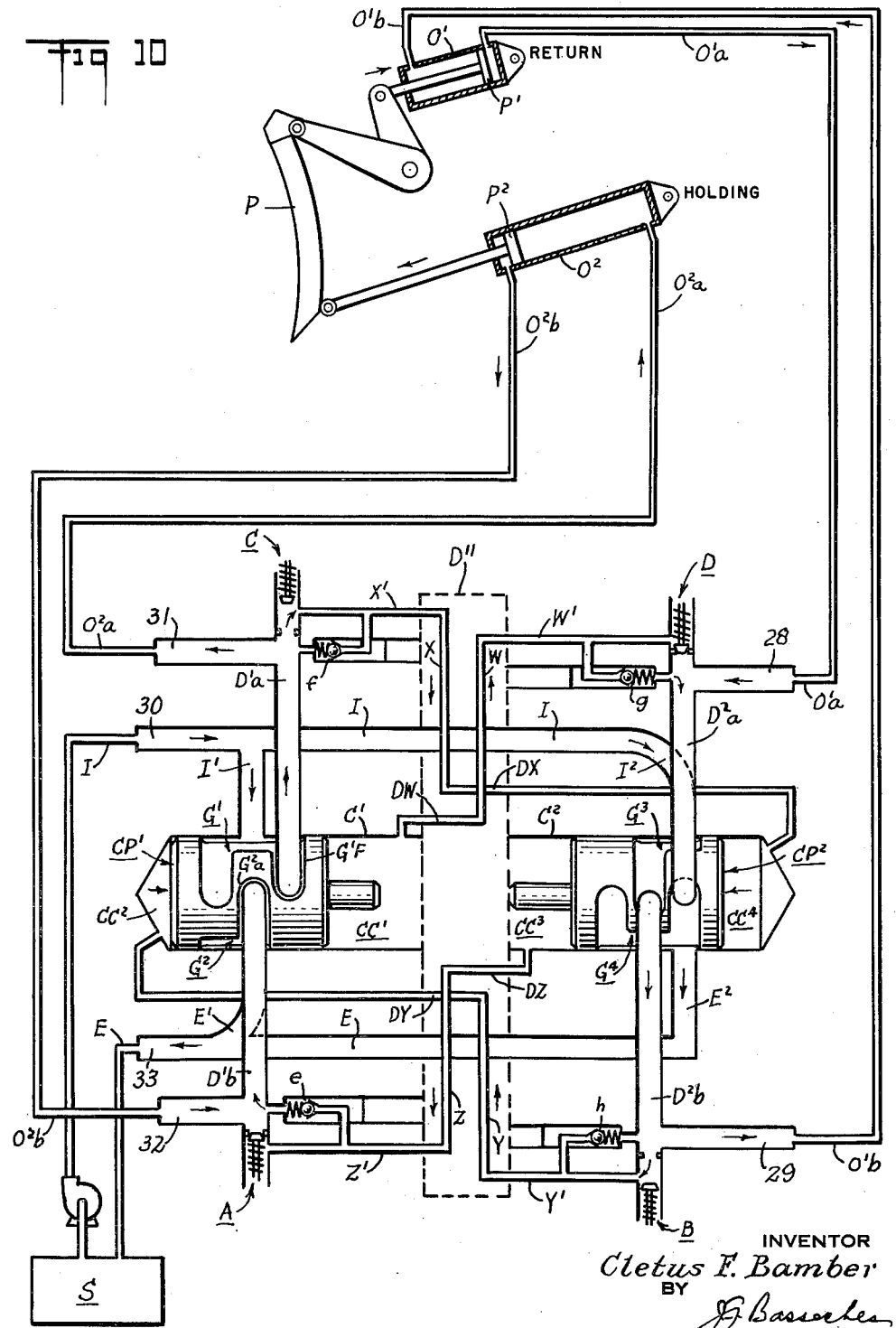

United States Patent Office 3,018,630
Patented Jan. 30, 1962

3,018,630
AUTOMATIC VALVE
Cletus F. Bamber, Forest Hills, N.Y., assignor to City Tank Corporation, Corona, N.Y., a corporation of New York
Filed Feb. 25, 1960, Ser. No. 10,987
13 Claims. (Cl. 60—97)

This invention relates to a control valve assembly and more particularly, this invention relates to a valve and automatic actuator assembly therefor adapted to be used in connection with a hydraulic powered device to actuate said device to perform a predetermined sequence of movements.

Still more particularly this invention relates to a hydraulic control assembly having pressure sensitive means which shift from one cycle of operation to the next succeeding cycle of operation of a hydraulic apparatus, responsive to pressure increases which accompany the completion of a portion of the cyclic operation aforesaid.

Still more particularly this invention relates to a control valve which may be used to actuate in sequence the packer assembly described and claimed in the co-pending joint application of Robert E. Brown and myself, filed April 28, 1959, and accorded Serial No. 809,435.

Still more particularly, this invention relates to a control assembly of the type described having novel structural features permitting economical manufacture and having a minimum of moving parts.

Still further, this invention relates to a control assembly as previously described having novel and compact valving means which enable the control unit to be compact and occupy the minimum space in the assembly.

In the copending application previously referred to, there is described and claimed a hydraulic system including two double acting hydraulic cylinder and piston assemblies adapted to act as the prime moving agents of a refuse packing plate or the like. The prime movers in that application move the packer plate therein described through a cyclical, non-linear path. A control assembly for accomplishing such cyclical movement automatically in the aforesaid application was described as comprising a plurality of individual components. In the present application there is described and illustrated structure which, for purposes of showing utility, is similarly illustrated in connection with the cyclical operation of a packer plate controlled by two prime moving, double acting hydraulic piston and cylinder mechanisms. It should be understood, however, that while the assembly has preferred utility in the combination as exemplified, that the control assembly herein described may itself suggest from this showing that it may be used for many other applications than the packer assembly with which it is illustrated and is in no wise limited in its usefulness to a device in which two prime movers are employed, it being understood that the valve assembly herein described may be modified in the manner herein taught to be used to reciprocate a single prime mover or, conversely, may be used to actuate in predetermined sequence, three, four or more prime moving operating cylinders.

Accordingly, it is an object of this invention to provide a control valve assembly adapted automatically to cycle a hydraulic device.

It is a further object of this invention to provide a control assembly for one or more hydraulically actuated devices to be operated in sequence in which completion of any one of the portions of said cycle actuates said control assembly and powerizes the hydraulic device intended to carry out the next succeeding cyclical movement.

A further object of this invention is to provide a valve control assembly as aforesaid which is economical to produce, and exceedingly compact.

Still a further object of this invention is to provide an automatic cycling control for a hydraulic apparatus wherein the next cyclical movement is initiated in response to the completion of the prior cyclical movement or the occurrence during any such movement of pressures in excess of a predetermined amount, such as the amount which might be encountered in the event of malfunctioning due to blockage or the like during any such movement.

To attain these objects and such further objects as may appear herein or be hereinafter pointed out, I make reference to the accompanying drawings, forming a part hereof, in which—

FIGURES 5 and 5A are end elevational views of the valve assembly showing two positions of the control handle;

FIGURE 6 is a section taken on the lines 6—6 of FIGURE 4;

FIGURE 7 is a section taken on the lines 7—7 of FIGURE 5A; and

FIGURES 8, 9 and 10 are diagrammatic views illustrating the positions assumed by the valve and other component parts at three stages during the operating cycle.

In FIGURES 2, 8, 9 and 10 there are illustrated the limiting cyclic positions assumed by packer plate P as the said plate is advanced by operating cylinders $O'$ and $O^2$. While $O^2$ in the illustrated embodiment in fact comprises two spaced apart operating cylinders, the two act as one centrally located cylinder and, for simplicity, will be thus described. The packer plate P, as fully explained in the co-pending joint application aforesaid, is located adjacent the refuse intake area of dump truck T and when cycled through the positions aforesaid, advances to a position further within the truck body, refuse deposited in front of plate P.

Figure 1:
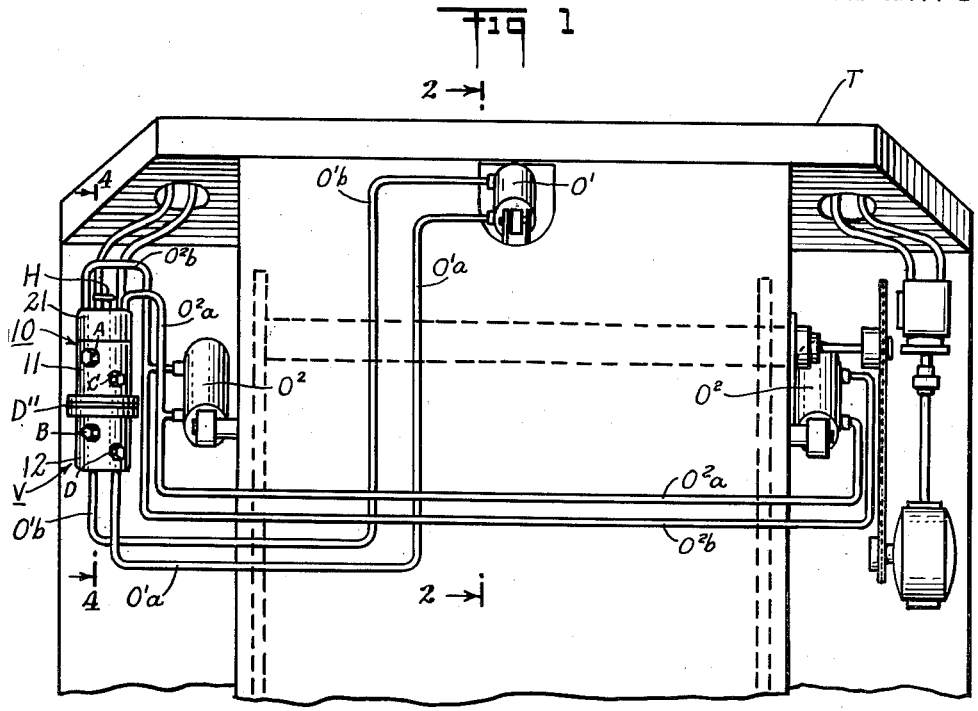
FIGURE 1 is a rear elevational view of a refuse truck utilizing a packer plate assembly, sequentially actuated by a valve control in accordance with this invention.
Figure 2:
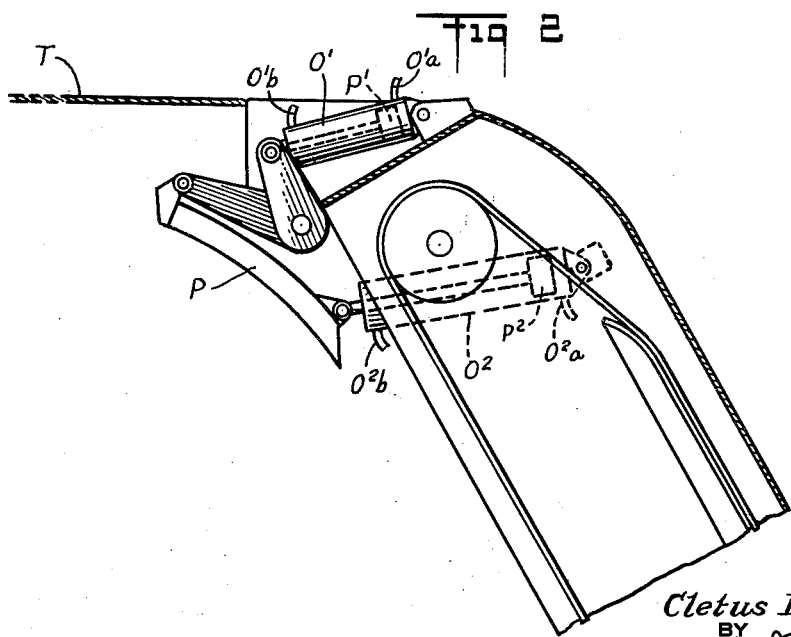
FIGURE 2 is a section taken on the lines 2—2 of FIGURE 1.

The plate P is shown in FIGURE 2 in the storage or deactivated position. When control handle H of the control valve assembly V is advanced to the forward position, the valve V acts, in a manner hereinafter to be described in detail, to extend piston $P'$, advancing the packer plate P to the position shown in FIGURE 8. Upon completion of the stroke of piston $P'$, a pressure increase in cylinder $O'$ is sensed by the valve control V, causing the control to divert pressure behind piston $P^2$ of operating cylinder $O^2$, extending piston $P^2$ and shifting the plate P from the position shown in FIGURE 8 to that of FIGURE 9. Similarly, completion of the extending stroke of piston $P^2$ and the resultant pressure increase in such cylinder actuates valve V, which initiates the next cyclic movement of plate P, to the position of FIGURE 10, which movement is powerized by retraction in operating cylinder $O'$ of piston $P'$. Completion of the operating cycle is effected by retraction in cylinder $O^2$ of piston $P^2$, such retraction again being triggered by pressure increases resulting from limited expansion occurring at the completion of the previous stroke.

Normally, the limited expansion of an operating cylinder which results in a shift in the operating cycle is occasioned by bottoming of a piston, but it will be appreciated that such limiting expansion may be caused by an obstruction in the path of movement of the apparatus (in this case the packer plate), which is actuated by the operating cylinders. Such premature recycling, where an obstruction is encountered in a prior cycle, will be readily recognized to provide a safety factor, preventing undue strain on the operating assembly.

The valve control V will now be described in detail, it being understood that such description is primarily for illustrative purposes and should be construed broadly except as limited by the claims. Thus, the number of control units provided may be varied, dependent upon the number of hydraulic units forming the system. Similarly, location and number of the component parts shall be considered critical only to the extent provided in the claims.

In the embodiment of the control valve V herein illustrated, specifically in FIGURES 3 to 8, a casing 10 is comprised of separate, open ended shells 11, 12, between the open ends of which there is interposed a central disk $D''$. The shells and disk are secured together to provide a leak-proof junction, as by bolts (not shown) which may be passed through the flanges 13, 14 of the shells and through appropriately positioned peripherally located apertures in the disk D.

Over the closed end 20 of the shell member 11, there is sealingly secured an apertured cap 21 (see FIGURE 4) having an annular recess 22, within which recess a selector disk 23 is rotatably mounted. A shaft 24, coupled to operating handle H, is passed through bearing aperture 25 and sealing O-ring 25a (FIGURE 6), the said shaft being keyed to disk 23 to cause the latter to rotate upon pivotal movement of the handle H.

The cap 21 is provided with apertures 30, 31, 32, 33, bored through the outer end 21' of the said cap into the recess 22, the said apertures having their centers lying on a circle concentric with the cap 21, and offset equal angular distances from each other.

The disk 23 is provided with apertures 30', 31', 32', 33' adapted in one rotated position of disk 23, to register with apertures 30, 31, 32, 33, respectively. In addition, the disk 23 is provided with apertures 34, 35 which are connected by shunting channel 36 (see FIGURES 3 and 6), the apertures 34, 35 being positioned to register with the cap apertures 30, 33, respectively, in one rotated position of the disk 23 with respect to the cap 21.

The shell 12 is provided with ports or apertures 28, 29, which may, by suitable means, be connected to pipe or hose lines $O'a$ and $O'b$, respectively, of operating cylinder $O'$, actuating the bell crank for the upper edge of the plate P. Similarly, apertures 31, 32 are connected to the lines $O^2a$, $O^2b$, of operating cylinder $O^2$, and apertures 30, 33 to the input or pressure (I) and output or exhaust (E) lines leading from a source of hydraulic fluid under pressure, such as a pump and reservoir.

In FIGS. 5A and 7, the handle H is shown in the neutral or shunt position in which the apertures 34, 35 of disk 23 are aligned with the apertures 30, 33 connected to the hydraulic source, resulting in a shunting of hydraulic fluid through channel 36 without actuation of the cylinders. When handle H is moved counterclockwise, as viewed in FIGURE 5, apertures 30', 31', 32', 33' will be rotated into registry with apertures 30, 31, 32, 33, respectively, thereby permitting fluid to flow through control valve V to energize the system.

The shells 11, 12 together comprising the casing 10 of valve V are provided with a pair of longitudinal borings I and E, which borings register with apertures ID and ED of disk $D''$ in the assembled relationship of the control valve, and thus communicate the input line (I) and exhaust line (E) substantially throughout the valve casing 10.

The shells 11, 12, at their open ends 17, 18, respectively, are provided with blind axial borings forming cylinders $C^1$, $C^2$, respectively. The cylinders $C^1$, $C^2$ for a distance inwardly of ends 17, 18 are provided with paired keying grooves $K^1$, $K^2$ for purposes which will appear hereafter.

Within the cylinders $C^1$, $C^2$, there is slidably and sealingly positioned a control piston, $CP^1$, $CP^2$, respectively. The trailing ends 41, 42, with respect to the blind end of cylinders $C^1$, $C^2$, of the pistons $CP^1$, $CP^2$, respectively, are provided with diametrically extending key members 43, 44, projecting from extensions 45, 46, respectively, the key members 43, 44 serving, when the pistons are positioned within their coordinated cylinders, to coact with longitudinally extended key slots $K^1$, $K^2$, respectively, and prevent relative rotation of the said pistons and cylinders.

In the assembled relationship of shells 11, 12 and disk $D''$, the previously open ends of cylinders $C^1$, $C^2$ will be sealed by the unapertured central portion of disk $D''$. When thus sealed, piston $CP^1$ will define control chamber $CC^1$ between the face $D^1$ of the disk $D''$ and one end of the piston, and control chamber $CC^2$ between the blind end of cylinder $C^1$ and the other end of piston $CP^1$. Similarly piston $CP^2$ riding in cylinder $C^2$ defines control chambers $CC^3$ and $CC^4$ between the face $D^2$ of disk $D''$ and one end of the said piston and the other end of piston $CP^2$ and the blind end of cylinder $C^2$, respectively.

Communication of the control chambers $CC^1$ and $CC^2$ of cylinder $C^1$ through disk $D''$ to shell 12, and communication of the control chambers $CC^3$, $CC^4$ of cylinder $C^2$ through disk $D''$ to shell 11 is effected in each instance by a radial boring extending outwardly from the chamber, and a longitudinal cross boring which intersects the radial boring and the inner faces or ends 17, 18 of shells 11, 12, respectively, Each such cross boring registers with an aperture DW, DX, DY, DZ formed in disk $D''$. Each such aperture in disk D, on the face of disk $D''$ away from the cross boring, communicates with a generally arcuate groove W, X, Y, Z, recessed in said face, which groove, in turn, registers with a longitudinal boring in the opposite shell at a position angularly displaced from the aperture in disk $D''$.

For purposes of simplicity, the fluid paths from the chambers $CC^1$, $CC^2$, $CC^3$ and $CC^4$ will, throughout the remaining description, be indicated by the letter corresponding to the groove in disk $D''$ through which the fluid flows.

The input and exhaust lines I and E are communicated to cylinders $C^1$ and $C^2$ by side ducts intersecting longitudinal borings I and E, and the inner walls of the said cylinders. Thus, the side ducts $E^1$ and $E^2$ provide exhaust access from the cylinder $C^1$ and $C^2$ for the line E, and side ducts $I^1$ and $I^2$ provide pressure input access to the cylinders $C^1$ and $C^2$ from the line I.

The cylinders $C^1$, $C^2$ are each provided with a pair of center ducts $D'a$, $D'b$, and $D^2a$ and $D^2b$, respectively. The ducts aforesaid extend radially from the outside of the casing and intersect the bore of the cylinders at longitudinally spaced points along a line parallel with the axis of the said cylinders.

Shells 11, 12 are provided with longitudinal borings 50, 51, 52, 53, which intersect the ducts $D^1a$, $D^1b$, $D^2a$, and $D^2b$, respectively (see FIGURE 4), and the faces of the shells. The borings 51, 50, 52, 53 are situated in proximate parallel relation to borings $X^1$, $Z^1$, $W^1$ and $Y^1$, respectively, which last mentioned borings comprise the continuation of the path of fluid leaving the chambers $CC^4$, $CC^3$, $CC^1$ and $CC^2$, respectively, after the fluid has passed through the disk $D''$. Borings $W^1$, $X^1$, $Y^1$ and $Z^1$ similarly begin at the faces of shells 11, 12 and intersect the center ducts, but the said borings are located radially outwardly with respect to borings 50, 51, 52, 53, and consequently intersect the center ducts at a point spaced outwardly with respect to the point of intersection of the last mentioned borings.

Spring seated ball check valves $e$, $f$, $g$ and $h$ are fitted into borings 50, 51, 52, 53, respectively. The trailing portions of these valves nearest disk $D''$ are adapted to seal the portions of the borings adjacent such disk against any flow of fluid beyond said trailing portions.

The valves $e$, $f$, $g$, $h$, which are generally cylindrical in shape, are provided with reduced annular portions 54, 55, 56, 57, respectively, which annular portions register with short radial borings $e'$, $f'$, $g'$, $h'$, paralleling the center ducts, and linking boring $X^1$ to valve $f$, $Z^1$ to valve $e$, $W^1$ to valve $g$, and $Y^1$ to valve $h$. Valves $e$, $f$, $g$, $h$ are each oriented to be normally closed, but to open when pressures in the lines $W^1$, $X^1$, $Y^1$, $Z^1$ exceed the pressure in ducts $D^2a$, $D^1a$, $D^2b$ and $D^1b$, respectively.

Pressure relief valves A, B, C and D secured to the casing 10, are projected, respectively, into center ducts $D^1b$, $D^2b$, $D^1a$ and $D^2a$. The relief valves, as may best be seen from FIGURES 3 and 4, each comprise a tapered stem 60 having an outwardly directed shoulder 61 and a cylindrical body 63 forming a guide for a coil spring 64 which may be seated on the body 63 with one end resting against the shoulder 61. The outermost parts of the center ducts are threaded, as at 65, and the casing portions surrounding the place of emergence of the said ducts are ground flat, as at 66, to permit a tight seal at the surface of the casing.

A cylindrical adjustment plug 67, threaded on its outer periphery and provided with an inner cylindrical boring 68, is sleeved over the spring 64 and valve body 63 and threaded into the portion 65 of the center ducts. It will be readily recognized that as plug 67 is threaded further into the casing 10, the tapered stem 60 will be seated with increasing spring tension against valve seat 69 formed at an inward position within the center ducts. With the plug 67 adjusted to provide the desired tension, the lock nut 70 may be threaded over the plug to prevent disorientation of the adjustment of said plug. Suitable gasket material (not shown) may be positioned over the flat area further to reduce the likelihood of leaks. A cap 71 may then be threaded over the extending portion of plug 67, to guard against tampering with the adjustment of the plug.

It will be noted, from the positions occupied by the valves A, B, C, D, that the net effect of such valves is to permit communication between ducts $D^1b$, $D^2b$, $D^1a$, and $D^2a$, and the lines $Z^1$, $Y^1$, $X^1$ and $W^1$, respectively, only when the pressure in operating cylinder lines $O^2b$, $O^1b$, $O^2a$ and $O^1a$, respectively, exceeds the pressure at which the relief valves are set to open.

The control pistons $CP^1$ and $CP^2$ are each provided on their outer peripheral faces with a pair of recessed, non-intercommunicating grooves $G^1$, $G^2$ and $G^3$, $G^4$, respectively. When the pistons $CP^1$ and $CP^2$ are seated in control cylinders $C^1$ and $C^2$, respectively, a base or branch portion is provided on each of the said grooves, each such base or branch being adapted, in all reciprocated positions, to register with one of the input or exhaust carrying side ducts $I^1$, $I^2$, $E^1$, $E^2$. Thus, a portion of branch $G^1b$ is in registry with duct $I^1$ and a portion of branch $G^2b$ is in registry with duct $E^1$ in all reciprocated positions of piston $CP^1$ in cylinder $C^1$. Similarly, a portion of branch $G^3b$ is in registry with duct $I^2$ and a portion of branch $G^4b$ with duct $E^2$ in all reciprocated positions of piston $CP^2$ in cylinder $C^2$.

Figure 3:
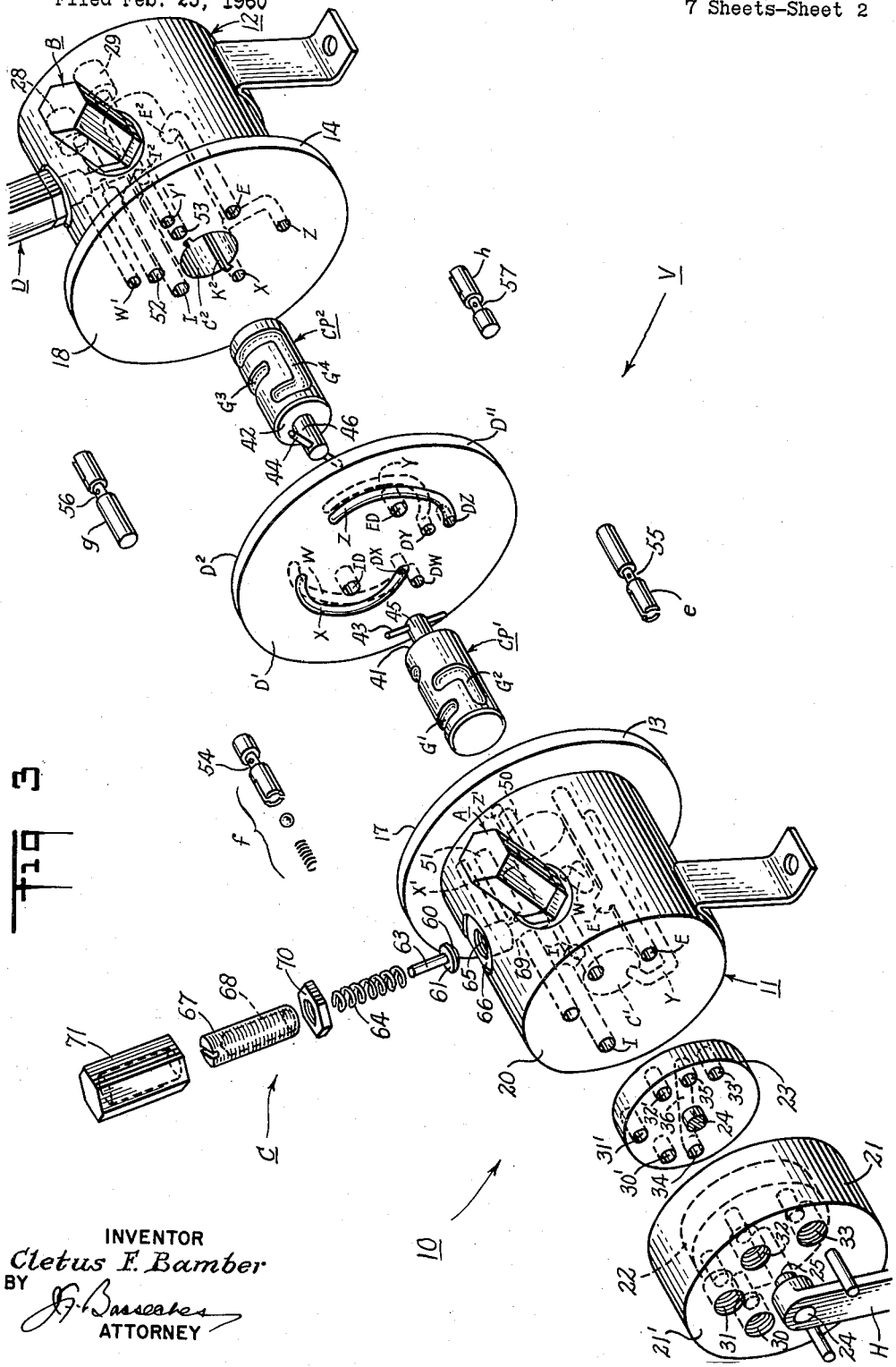
FIGURE 3 is an exploded isometric view, partly in phantom, of a control device in accordance with the invention prior to assembly.
Figure 4:
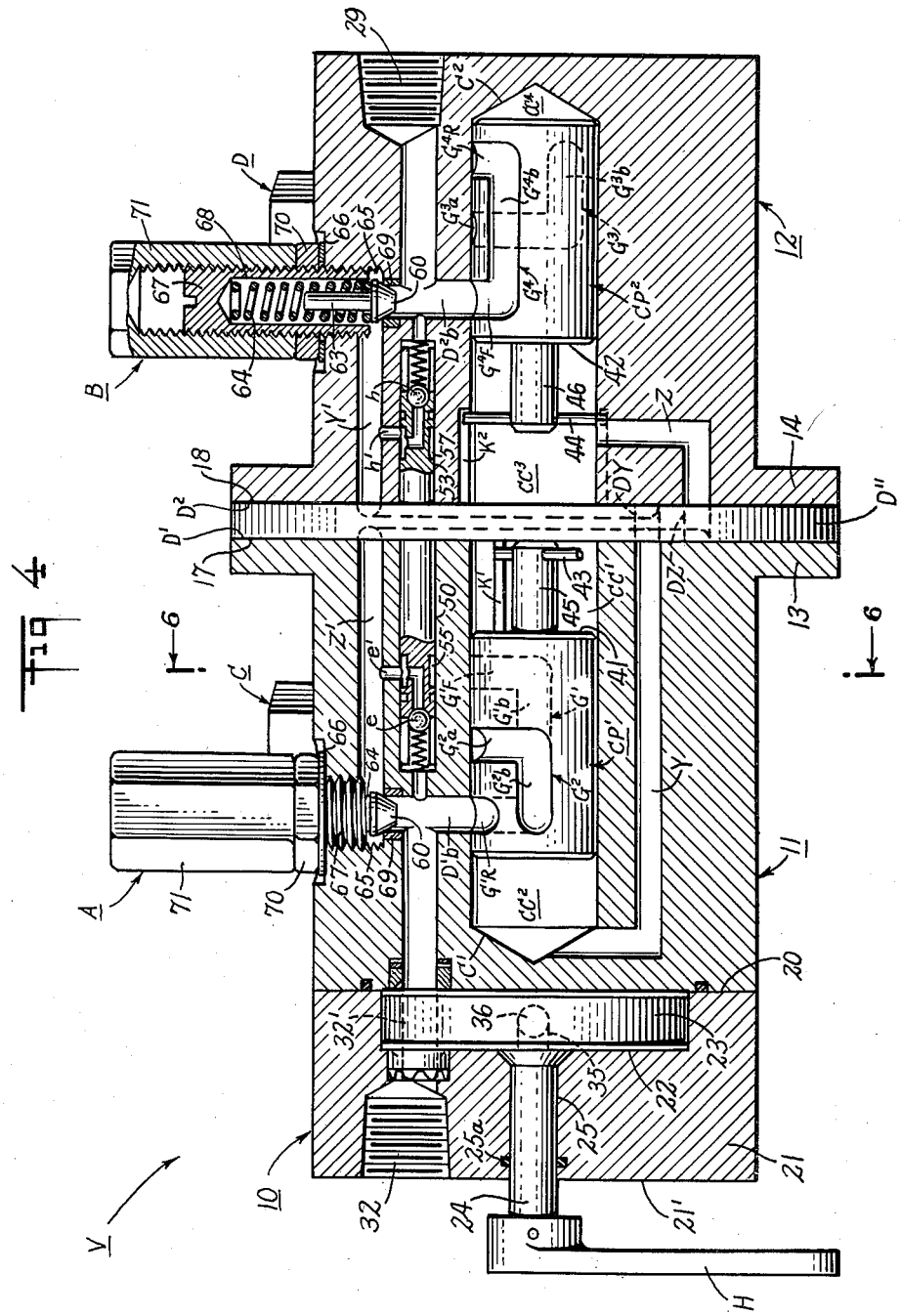
FIGURE 4 is a magnified cross-section taken on the lines 4—4 of FIGURE 1.

The grooves are provided with side arms which extend from the branch portions aforesaid, and are adapted, in the reciprocated positions of the control pistons, to register with the center ducts. As best seen in FIGURE 3 and the diagrammatic FIGURES 8, 9 and 10, grooves $G^1$ and $G^4$ are provided with a pair of spaced apart forward and rearward arms $G^1F$, $G^1R$, $G^4F$, $G^4R$, respectively. Grooves $G^2$ and $G^3$ are each provided with a single arm $G^2a$ and $G^3a$, respectively, which is located substantially medially with respect to the longitudinal spacing of the arms of grooves $G^1$ and $G^4$. The spacing of the medial arms from the forward and rearward arms is substantially equal to the longitudinal spacing of one center duct with respect to the other.

Thus, when piston $CP^1$ is in the right hand position shown in FIGURE 8, center duct $D^1a$ registers with arm $G^2a$ of groove $G^2$, and duct $D^1b$ registers with arm $G^1R$ of groove $G^1$. When the piston $CP^1$ is shifted, the connections to the center ducts reverse and duct $D^1a$ communicates with groove $G^1$ by registering in this position with arm $G^1F$ of this groove. Similarly, in such reversed position of the piston $CP^1$, duct $D^1b$ registers with arm $G^2a$ of groove $G^2$.

The grooves of piston $CP^2$ similarly are connected first with one and then the other of the center ducts $D^2a$, $D^2b$, the connections being duct $D^2a$ to $G^3a$, and $D^2b$ to $G^4F$, in the right hand shifted position of piston $CP^2$ shown in FIGURE 8, and duct $D^2a$ to arm $G^4R$, and duct $D^2b$ to arm $G^3a$ in the left hand shifted position of the said piston.

*Résumé of operation*

A better understanding of the operation of the control assembly previously described will be had by correlating the movements of the control valve components with the movements of operating pistons $P^1$ and $P^2$.

With the operating cylinders $O^1$, $O^2$ positioned as shown in FIGURE 2, and with selector handle H rotated so that disk apertures 30', 33' are in alignment with apertures 30, 33, respectively, the input I and exhaust E lines within the control assembly are communicated with the pressure and exhaust lines, respectively, of the pump and reservoir of hydraulic supply S.

In the latter position of the selector handle H, fluid under pressure is introduced into side ducts $I^1$ and $I^2$, and the reservoir or exhaust line to side ducts $E^1$ and $E^2$ in control cylinders $C^1$ and $C^2$, respectively. With the control pistons $CP^1$ and $CP^2$ oriented as shown in FIGURE 8, fluid under pressure flows into groove $G^1$ and out duct $D^1b$ to line $O^2b$, causing piston $P^2$ to be held in the retracted position shown in FIGURE 8. Similarly, fluid from duct $I^2$ flowing into groove $G^3$ is introduced into duct $D^2a$ and thus line $O^1a$, causing the piston $P^1$ to be extended from the dot and dash position of FIGURE 8 to the solid line position. Fluid exhausted from chamber $P^1b$ of cylinder $O^1$ passes back through line $O^1b$, through duct $D^2b$ and thence to exhaust line E through groove $G^4$ to duct $E^2$.

When the piston $P^1$ extends fully in cylinder $O^1$ and "bottoms" or contacts the end of said cylinder, a pressure in line $O^1a$ is developed, which pressure is sufficient to unseat relief valve D which heretofore had blocked the passage of fluid to line $W^1$. Fluid is thus permitted to flow through line $W^1$, around groove W in disk D'', through aperture DW in the said disk, and then through line W into chamber $CC^1$ of control cylinder $C^1$.

The fluid introduced into $CC^1$ acts to force piston $CP^1$ to the left when said piston is viewed as shown in FIGURE 8. In the course of such movement, the said piston is prevented from rotating with respect to cylinder $C^1$ by the engagement of cross key 43 with longitudinal key slots $K^1$. As the piston $CP^1$ shifts to the left, fluid in chamber $CC^2$ is forced progressively through line Y, aperture DY, line $Y^1$, line $h'$, unseating the ball check valve $h$, and finally to duct $D^2b$ (connected through groove $G^4$) to the exhaust.

The control valve components will, upon completion of the movement of $CP^1$, occupy the positions shown in FIGURE 9. With the said piston thus shifted, the groove arm $G^1F$ will be in alignment with center duct $D^1a$, communicating pressure from line I to this duct, and duct $D^1b$ will be aligned with arm $G^2a$, communicating the exhaust line E (through groove $G^2$ to duct $E^1$) with such duct. Fliud under pressure will thus flow through duct $D^1a$ to line $O^2a$, into chamber $P^2a$ of operating cylinder $O^2$, causing piston $P^2$ to shift from the dot and dash position shown in FIGURE 9 to the solid line or extended position. Fluid expelled from chamber $P^2b$ passes to the exhaust line through line $O^2b$ into center duct $D^1b$ and through groove arm $G^2a$ and branch $G^2b$ into duct $E^1$.

During the shifting of piston P², the piston P¹ is maintained in extended position by pressure in line O¹a.

When piston P² bottoms in cylinder O², pressures in line O²a cause unseating of relief valve C, permitting fluid to flow through line X¹, through the path of groove X, aperture DX, to line X, to control chamber CC⁴ of control cylinder C². Piston CP² is thereby shifted from the position shown in FIGURE 9 to the left hand position shown in FIGURE 10, causing center duct D²b to be communicated with groove G³ and duct D²a to be communicated with groove G⁴. Fluid exhausted from chamber CC³ passes through line Z, aperture DZ, groove Z, line Z¹, into line e', unseating valve e, and thence to duct D¹b which is in communication, at this phase of the cycle, with exhaust line E.

The shifting aforementioned of piston CP² causes the retraction of piston P¹ from the position shown in FIGURE 9 to that of FIGURE 10. Pressured fluid flows from I² through groove G³ into duct D²b and line O¹b into chamber P¹b, the exhaust from P¹a being returned to line E via line O¹a, duct D²a, groove G⁴ and side duct E².

Bottoming upon retraction of piston P¹ opens valve B, permitting fluid flow through line Y¹, groove Y, aperture DY, line Y and into chamber CC². Piston or spool CP¹ is shifted to the right (the position shown in FIGURE 8), and exhaust from chamber CC¹ is forced through lines W, aperture DW, groove W to line W¹, to g' through valve g and into the exhaust connected duct D²a.

The final movement of the cycle, viz., the return of P² to the retracted position shown in FIGURE 2, is effected in similar manner by the aforesaid shifting of piston CP¹, which results in connecting line O²b to the pressure line I and O²a to the exhaust line E. Bottoming on the return stroke of piston P² opens valve A, which serves to admit fluid to chamber CC³ and shift piston CP² to the right, as shown in FIGURE 8. Exhaust from chamber CC⁴ flows through valve f, into duct D¹a, through groove G², side duct E¹ to line E and the reservoir.

The cycled movement of the packer plate P actuated by cylinders O¹ and O² will be continuous so long as fluid is admitted to line I and exhausted from line E. Operation of the plate P may be interrupted by shutting off the source of power, or by shifting handle H to the neutral position wherein apertures 30' and 33' are thrown out of registry with apertures 30, 33, thereby interrupting the flow of fluid to the operating cylinders and shunting it instead through groove 34 in disk 23.

While change from one cycled movement to the next is normally effected responsive to pressure increases resulting from bottoming of an operating piston upon completion of a cycled movement, it will be appreciated that interruption of a cycled movement prior to completion, as by jamming, undue load, or otherwise, will likewise cause a pressure increase and if the interrupting influence is of sufficient magnitude, will cause the relief valve associated with the pressure line of the moving operating cylinder to shift to the next succeeding cyclical movement. As a result, the application of a force sufficient to distort or otherwise injure the packer plate or its associated operating mechanism will be avoided.

The novel valving and control mechanism herein described and hereafter claimed provides a highly flexible system whereby one or more hydraulic devices to be operated may be automatically actuated in sequence. The pressures at which the devices are to operate may be varied at will by variation of the relief valves provided.

The system may, by reversing the pressure and exhaust inlet connections to the control assembly, be operated in a reverse cycle wherein the movements of the operating pistons and valve components take place in inverse order to the order of operation described.

Moreover, as previously pointed out, since recycling of the device is effected responsive to pressure build ups in the device rather than completion of a prior cycle, overloading of the device is prevented.

Having thus described the invention and illustrated its use, what is claimed as new and desired to be secured by Letters Patent is:

1. For use in connection with a hydraulic operating cylinder having an operating piston reciprocably mounted therein and dividing said cylinder into two chambers, a valve and control assembly adapted to control pressurized fluid in a pressure line of a hydraulic system so as to automatically reciprocate said operating piston in said operating cylinder, comprising a control valve adapted to connect the pressure line to one said chamber and an exhaust line to the other said chamber, said control valve being shiftable to reverse said connections, a control cylinder having a control piston reciprocably mounted therein and dividing said control cylinder into two chambers, said control piston forming a part of said valve and adapted to reverse said connections upon being reciprocated from one end to the other end of said control cylinder, each chamber of said operating cylinder being connected to a chamber of said control cylinder through composite valve means comprising a normally closed primary pressure relief valve shiftable to open position responsive to predetermined unseating pressure in said operating cylinder, and a normally closed secondary valve connected in parallel with said primary valve, adapted to open when the pressure at the control cylinder side of said secondary valve exceeds the pressure at the operating cylinder side of said secondary valve.

2. A device in accordance with claim 1 wherein said control valve comprises grooves defined by the control cylinder engaging periphery of said control piston, and valve ducts communicating with said grooves but not said chambers of said control cylinder.

3. A device in accordance with claim 1 wherein said control valve comprises two pairs of ducts communicating at spaced points with the bore of said control cylinder, and grooves defined by the control cylinder engaging periphery of said control piston, said grooves connecting each duct of said first pair to a duct of said second pair in one limiting reciprocated position of said control piston in said control cylinder, and reversing said connections when said control piston is shifted to said other limiting position.

4. A device in accordance with claim 1 wherein said control valve comprises a pair of non-interconnecting grooves defined by the control cylinder engaging periphery of said control piston, a first pair of ducts, each of which communicates with one of said grooves in the limiting reciprocated positions of said control piston in said control cylinder and a second pair of ducts, one of said second pair being connected to one of said grooves and the other of said second pair being connected to the other of said grooves in the retracted position of said control piston in said control cylinder, said connections of said second pair being reversed when said control piston is in protracted limiting position in said control cylinder.

5. A devce in accordance with claim 1 where said control valves comprise a pair of center ducts communicating with the inner wall of said control cylinder at points longitudinally spaced apart along a line parallel with the axis of said control cylinder, a pair of side ducts communicating with the inner wall of said control cylinder at points circumferentially displaced from each other and from said line, and first and second, non-intercommunicating grooves defined by the outer cylinder engaging periphery of said control piston, each of said grooves including a longitudinally directed branch portion adapted to register with one of said side ducts in the limiting reciprocated position of said control piston, said first groove including a pair of circumferentially extending side arms, one said side arm being in registry with one said center duct in one limiting position and the other said side arm beng aligned with the other said center duct in the other limiting position of said control piston in said control cylinder, and a circumferentially directed side arm forming a part of said second groove, registering in the limiting positions of said control piston, with the center duct not in registry with a side arm of said first groove.

6. In a hydraulic device including a plurality of hydraulic operating cylinders each to be operated in sequence, said operating cylinders having an operating piston reciprocably mounted therein to divide the same into two chambers, a valve and control assembly adapted to control pressurized fluid in a pressure line of a hydraulic system so as to automatically actuate said operating pistons in predetermined sequence, comprising a complemental control valve for each said operating cylinder, connecting the pressure line to one chamber of its complemental operating cylinder and an exhaust line of the hydraulic system to the other said chamber, said valves being shiftable to reverse said connections, a complemental control cylinder associated with each said valve, each said control cylinder including a control piston mounted therein to divide the latter into two chambers, each said control piston forming a part of one said control valve and adapted, upon reciprocation within the control cylinder to reverse said connections, and composite valve means connecting a chamber of each said operating cylinder with the chambers of the control cylinder, the control piston of which is operatively associated with the valve controlling the operating cylinder next in sequence, said composite valve means comprising a normally closed primary pressure relief valve, shiftable to open position responsive to predetermined unseating pressure in the chambers of said operating cylinder, and a normally closed secondary spring biased ball check valve connected in parallel with said primary valve and adapted to open when the pressure at the control cylinder side of said secondary valve exceeds the pressure at the operating cylinder side of said valve.

7. A device in accordance with claim 6 wherein said control valve comprises grooves defined by the control cylinder engaging periphery of said control piston, and valve ducts communicating with said grooves but not said chambers of said control cylinder.

8. A device in accordance with claim 6 wherein said control valve comprises two pairs of ducts communicating at spaced points with the bore of said control cylinder, and grooves defined by the cylinder engaging periphery of said control piston, said grooves connecting each duct of said first pair to a duct of said second pair in one limiting reciprocated position of said control piston in said control cylinder, and reversing said connections when said control piston is shifted to said other limiting position.

9. A device in accordance with claim 6 wherein said control valve comprises a pair of non-interconnecting grooves defined by the cylinder engaging periphery of said control piston, a first pair of ducts, each of which communicates with one of said grooves in the limiting reciprocated positions of said control piston in said control cylinder and a second pair of ducts, one of said second pair being connected to one of said grooves and the other of said second pair being connected to the other of said grooves in the retracted position of said control piston in said control cylinder, said connections of said second pair being reversed when said control piston is in protracted limiting position in said control cylinder.

10. A device in accordance with claim 6 where said control valves comprise a pair of center ducts communicating with the inner wall of said control cylinder at points longitudinally spaced apart along a line parallel with the axis of said control cylinder, a pair of side ducts communicating with the inner wall of said control cylinder at points circumferentially displaced from each other and from said line, and first and second, non-intercommunicating groves defined by the outer cylinder engaging periphery of said control piston, each of said grooves including a longitudinally directed branch portion adapted to register with one of said side ducts in the limiting reciprocated position of said control piston, said first groove including a pair of circumferentially extending side arms, one said side arm being in registry with one said center duct in one limiting position and the other said side arm being aligned with the other said center duct in the other limiting position of said control piston in said control cylinder, and a circumferentially directed side arm forming a part of said second groove, registering in the limiting positions of said control piston, with the center duct not in registry with a side arm of said first groove.

11. An automatic control valve assembly for actuating in sequence a pair of double acting hydraulic operating cylinder assemblies, each said operating cylinder assembly including an operating piston mounted for reciprocation therein and dividing the operating cylinder into two chambers, comprising, a casing divided into halves, each said half including a control cylinder, a control piston reciprocable in each said control cylinder to predetermined retracted and protracted limiting positions within said control cylinder to divide the latter into two chambers, a pair of center ducts communicating with the inner wall of said control cylinder at points longitudinally spaced apart along a line parallel with the axis of said control cylinder, a pair of side ducts communicating with the inner wall of said control cylinder at points circumferentially displaced from each other and from said line, first and second recessed, non-intercommunicating grooves defined by the outer cylinder engaging periphery of each said control piston, each of said grooves including a longitudinally directed branch portion adapted to register with one of said side ducts in the forward and rearward limiting positions of said control piston, said first groove including a pair of circumferentially extending side arms, one said side arm being aligned with one said center duct in the protracted position and the other said side arm being aligned with the other said center duct in the retracted position of said piston, a circumferential side arm forming a part of said second groove and lying in registry in the protracted and retracted positions of said control piston with the center duct not in registry with a side arm of said first groove, connector means communicating a chamber of each said control cylinder with a center duct of the other control cylinder, and composite valve means interposed in each said connector means, said composite valve means comprising a normally closed primary pressure relief valve, shiftable to open position responsive to predetermined unseating pressure in said center ducts and a normally closed secondary valve, connected in parallel with said primary valve, and adapted to open when the pressure in said control cylinder chamber exceeds the pressure in said central ducts.

12. A device in accordance with claim 11 wherein one end wall of each said control cylinder is defined by a plate member common to both said control cylinders, and said connection means include grooves formed in the walls of said plate member.

13. A device in accordance with claim 11 wherein said control cylinders comprise axially aligned members having opposed open end portions spaced from each other, and a plate member secured to said open end portions to form an end wall for said cylinders, said connection means including non-intersecting grooves formed in the walls of said plate member, said grooves being out of registry with the faces of said plate member forming the end walls of said control cylinders.

References Cited in the file of this patent

UNITED STATES PATENTS

| | | |
|---|---|---|
| 1,952,690 | Strom | Mar. 27, 1934 |
| 2,342,450 | Campbell | Feb. 22, 1944 |
| 2,550,723 | Ross | May 1, 1951 |
| 2,698,517 | Witt | Jan. 4, 1955 |